United States Patent
Yousef et al.

(10) Patent No.: US 12,179,180 B1
(45) Date of Patent: Dec. 31, 2024

(54) ORGANOSELENIUM COMPOUNDS WITH GOLD-MODIFIED Bi2O3/TiO2 SUPPORTED IN CARBON-ACTIVATED CARBONS

(71) Applicant: IMAM MOHAMMAD IBN SAUD ISLAMIC UNIVERSITY, Riyadh (SA)

(72) Inventors: Tarek Ahmed Yousef, Riyadh (SA); Hanan A. Althikrallah, Riyadh (SA); Saad Shaaban, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/669,187

(22) Filed: May 20, 2024

(51) Int. Cl.
| | | |
|---|---|---|
| *B01J 27/057* | (2006.01) | |
| *B01J 21/06* | (2006.01) | |
| *B01J 23/18* | (2006.01) | |
| *B01J 35/00* | (2024.01) | |
| *B01J 35/39* | (2024.01) | |
| *B01J 35/45* | (2024.01) | |
| *B01J 35/50* | (2024.01) | |

(Continued)

(52) U.S. Cl.
CPC .......... *B01J 27/0573* (2013.01); *B01J 21/063* (2013.01); *B01J 23/18* (2013.01); *B01J 35/19* (2024.01); *B01J 35/39* (2024.01); *B01J 35/45* (2024.01); *B01J 35/505* (2024.01); *B01J 35/613* (2024.01); *B01J 37/0009* (2013.01); *B01J 37/24* (2013.01)

(58) Field of Classification Search
CPC ........ B01J 27/0573; B01J 35/45; B01J 35/19; B01J 35/613; B01J 35/505; B01J 35/39; B01J 21/063; B01J 23/18; B01J 37/0009; B01J 37/24
USPC ........................................ 502/215, 350, 353
See application file for complete search history.

(56) References Cited

U.S. PATENT DOCUMENTS

| | | |
|---|---|---|
| 2010/0080898 A1 | 4/2010 | Danner et al. |
| 2010/0152030 A1 | 6/2010 | Bai et al. |
| 2014/0012021 A1 | 1/2014 | Lim et al. |

FOREIGN PATENT DOCUMENTS

| | | |
|---|---|---|
| CN | 116273160 A | 6/2023 |

OTHER PUBLICATIONS

Zainab Mahdi, et al., "Date Palm (*Phoenix dactylifera* L.) Seed Characterization for Biochar Preparation", The 6th International Conference on Engineering, pp. 130-138. (Year: 2015).*

(Continued)

*Primary Examiner* — Patricia L. Hailey
(74) *Attorney, Agent, or Firm* — Oblon, McClelland, Maier & Neustadt, L.L.P.

(57) ABSTRACT

A method of producing a Se/Biochar-Au—$Bi_2O_3$/$TiO_2$ catalyst includes acid treatment of a palm waste with phosphoric acid to form an acid-treated palm waste, carbonizing the acid-treated palm waste to form an acid-treated biochar, and chlorinating acyl groups present on the acid-treated biochar with oxalyl chloride to form a chlorinated biochar. The method may include reacting the chlorinated biochar with an organoselenium compound to form an organoselenium-functionalized biochar and mixing the organoselenium-functionalized biochar with Au-doped $Bi_2O_3$/$TiO_2$ particles to form the Se/Biochar-Au—$Bi_2O_3$/$TiO_2$ catalyst.

20 Claims, 3 Drawing Sheets

(51) Int. Cl.
  *B01J 35/61* (2024.01)
  *B01J 37/00* (2006.01)
  *B01J 37/24* (2006.01)

(56) References Cited

OTHER PUBLICATIONS

O. Houache, et al., "Study of Date Palm Stem as Raw Material in Preparation of Activated Carbon", The Journal of Engineering Research, vol. 5, No. 1, pp. 47-54. (Year: 2008).*

Shoaib, et al., "Optimization and Characterization of Sliced Activated Carbon Prepared From Date Palm Tree Fronds by Physical Activation", Biomass and Bioenergy 73, pp. 124-134. (Year: 2015).*

Yu Xue et al., "Preparation of Au/BiOBr/Graphene composite and its photocatalytic performance in phenol degradation under visible light." Journal of Fuel Chemistry and Technology, vol. 44, Issue 8, pp. 937-942. (Year: 2016).*

Yan Wang et al., "Ag nanoparticle-decorated Bi2O3—TiO2 heterogeneous nanotubular photocatalysts for enhanced degradation of organic contaminants." Colloids and Surfaces A: Physicochemical and Engineering Aspects 648, pp. 1-9. (Year: 2022).*

Vahid Barahimi et al., "Cu doped TiO2—Bi2O3 nanocomposite for degradation of azo dye in aqueous solution: Process modeling and optimization using central composite design." Journal of Environmental Chemical Engineering 7, pp. 1-8. (Year: 2019).*

Adriana Correa-Guimaraes et al., "Conversion of lignocellulosic residues obtained from Macauba Palm y Pinus Pinea in high added value products." (English translation of Citation 25 in Applicants' Information Disclosure Statement.) (Year: 2014).*

Neda Abedian-Dehaghani, et al., "Selenium and nitrogen co-doped biochar as an efficient metal-free catalyst for oxidation of aldehydes", Journal of Molecular Structure, vol. 1264, Sep. 15, 2022, p. 133237.

Liwei Feng, et al., "Au modified Bi2O3—TiO2 hybrid for photocatalytic synthesis of hydrogen peroxide", Catalysis Communications, vol. 155, Jul. 2021, p. 106315.

Adriana Correa Guimaraes, et al., "Conversion of lignocellulosic waste from Macauba ("Acrocomia aculeata") and Pine Nut ("Pinus Pinea") into products with very high added value", 2014, pp. 1824-1830.

* cited by examiner 4,4'-(((diselanediylbis
(4,1-phenylene))
bis(azanylylidene))bis(methanylylidene))
bis(2-methoxyphenol)

1,1'-(((diselanediylbis
(4,1-phenylene))bis(azanylylidene))bis
(methanylylidene))bis(naphthalen-2-ol)

N,N'-(diselanediylbis(4,1-phenylene))
bis(1-([2,2'-bipyridin]-5-yl)methanimine)

ORGANOSELENIUM COMPOUNDS WITH GOLD-MODIFIED Bi2O3/TiO2 SUPPORTED IN CARBON-ACTIVATED CARBONS

BACKGROUND

Technical Field

The present disclosure is directed to organoselenium compounds, and more particularly, to organoselenium compounds, specifically diselenide bis-schiff-bases, with gold-modified $Bi_2O_3/TiO_2$ supported in carbon biochar for use as a photocatalyst.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Rapid population growth has resulted in increased energy usage worldwide. An efficient approach to resolving energy and environmental issues is the development of a sustainable source of renewable energy. Current approaches for developing a sustainable source of renewable energy include the use of solar and wind power. These energy sources, however, can be unreliable, thus requiring non-renewable sources still be used to meet the population's energy needs. Thus, it is desirable to create a method of sustainable and reliable energy conversion.

Photocatalysis technology is a rapidly-evolving field of scientific research that has garnered significant attention in recent years. Photocatalysis comprises reactions that take place by utilizing light and a semiconductor. Specifically, a photocatalyst, or semiconductor, absorbs light and acts as a catalyst for the photocatalysis reaction. Photocatalysis occurs when an electron-hole pair is generated on exposure of a semiconducting material to light. When compared to conventional pollution treatment methods, photocatalytic degradation of environmental toxins offers numerous advantages to current methods, comprising low energy consumption, ease of operation, mild reaction conditions, and reduced secondary pollution. Thus, photocatalysis is a more sustainable and eco-friendly approach to renewable energy, making catalysis material an increasing target for research in photocatalytic pollutant degradation technology Organoselenium compounds have shown promise in environmental remediation and sustainable energy applications. Traditionally, organoselenium compounds (diorganyl diselenides) are known for their redox activity and ability to engage in various chemical transformations. For example, certain organoselenium compounds have been investigated for their potential to degrade organic pollutants in water and soil through oxidation reactions, thereby helping restore contaminated sites. Organoselenium compounds have further been investigated for their photovoltaic properties, with potential applications being incorporation into solar energy conversion devices, such as organic photovoltaic cells.

Bismuth trioxide ($Bi_2O_3$) and titanium dioxide ($TiO_2$) nanoparticles serve as primary photocatalytic materials, offering a broad spectrum of light absorption and high catalytic activity.

$Bi_2O_3$ is a p-type metal oxide semiconductor with high dielectric permittivity and refractive index, a remarkable band gap of about 2.85 to 2.58 eV, excellent photoconductivity, and high photoluminescence. In addition, $Bi_2O_3$ is nontoxic in nature and is involved in several different catalytic activities, such as ionic conductivity. Despite $Bi_2O_3$ exhibiting high efficiency in promoting photooxidations, the inability of its conduction band electrons (~+0.33 V vs. NHE) to interact with organic molecules results in fast electron-hole pair recombination, which hinders application in reduction processes. Nevertheless, several studies have been reported on the enhancement of its activity by doping or tuning its surface.

$TiO_2$ particles have strong oxidative powers and photostability under ultraviolet (UV) light, making it an effective tool for catalyzing a variety of reactions. In environmental remediation, $TiO_2$ photocatalysis is utilized for the degradation of organic pollutants in air and water. When exposed to UV light, $TiO_2$ generates electron-hole pairs, leading to the formation of highly reactive oxygen species such as superoxide radicals and hydroxyl radicals. One of the main drawbacks of $TiO_2$ is its relatively low efficiency in utilizing visible light for photocatalytic reactions. $TiO_2$ primarily absorbs ultraviolet (UV) light, which constitutes only a small portion of the solar spectrum. This limits its practical application for indoor or outdoor environments where UV light is not readily available. Researchers are actively working on modifying $TiO_2$ or developing new photocatalysts to enhance its performance under visible light.

Gold (Au) nanoparticles also act as electron traps, facilitating charge separation and extending light absorption into the visible range. When acting as an electron trap, the gold nanoparticles capture and hold onto electrons for a prolonged time. This feature facilitates charge separation, which is an important process in photochemical reactions. Furthermore, gold nanoparticles are capable of extending light absorption into the visible range, making them particularly useful for applications that involve light absorption and emission. Overall, gold nanoparticles have a lot of potential for use in solar cell technology.

Furthermore, selenated Schiff bases are unique ligands that contain both 'hard' and 'soft' donor centers and act readily as hemilabile ligands. Notably, most organoselenium complexes are more stable, durable, labile, and bioactive than their organosulphur counterparts. Presently, there is a need for a sustainable photocatalyst that can provide enhanced photocatalytic performance under visible light irradiation. Although several photocatalysts have been developed in the past for photoelectrochemical degradation of organic pollutants, there still exists a need to fabricate and explore more efficient and cost-effective hybrid photocatalysts with enhanced activity.

Combining these components on a support matrix that utilizes the biochar's abundant, renewable, and carbon-rich nature, resulting in a synergistic effect because the biochar, $TiO_2$, $Bi_2O_3$, gold, and organoselenium compounds work in combination to increase the amount of visible light absorbed and surface area available for photocatalytic reactions. This synergistic effect, therefore, is anticipated to facilitate electron transfer and enhance a photocatalytic system for energy conversion under both UV and visible light.

Accordingly, it is one object of the present disclosure to provide an efficient photocatalytic system for energy conversion by combining the above-mentioned components on a support matrix that blends the high surface area, renewable, and carbon-rich nature of the biochar with the photocatalytic activities of $TiO_2$, $Bi_2O_3$, and Au.

SUMMARY

In one embodiment, a method of producing a Se/Biochar-Au—$Bi_2O_3/TiO_2$ catalyst is described. The method comprises acid treatment of a palm waste with phosphoric acid to form an acid-treated palm waste, carbonizing the acid-treated palm waste to form an acid-treated biochar, and chlorinating acyl groups present on the acid-treated biochar with oxalyl chloride to form a chlorinated biochar. The method further comprises reacting the chlorinated biochar with an organoselenium compound to form an organoselenium-functionalized biochar and mixing the organoselenium-functionalized biochar with Au-doped $Bi_2O_3/TiO_2$ particles to form the Se/Biochar-Au—$Bi_2O_3/TiO_2$ catalyst.

In some embodiments, the method further comprises reacting a diselenide and an aromatic aldehyde to form the organoselenium compound.

In another exemplary embodiment, the method further comprises mixing $Bi_2O_3/TiO_2$ particles with an aqueous chloroauric acid ($HAuCl_4$) solution to form a catalyst precursor and then calcining the catalyst precursor to form the Au-doped $Bi_2O_3/TiO_2$ particles.

In some embodiments, the organoselenium compound is selected from the group consisting of hyde in an organic solvent to obtain a mixture and heating the mixture at a temperature of 60 to 100° C. for 6 to 10 hours (h).

In some embodiments, the mixture is heated at a temperature is 80° C.±5° C. for 8 h.

In some embodiments, the aromatic aldehyde is selected from the group consisting of

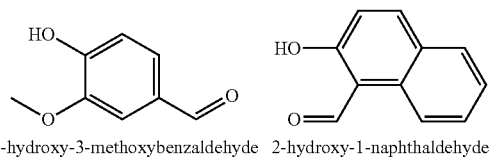

4-hydroxy-3-methoxybenzaldehyde  2-hydroxy-1-naphthaldehyde

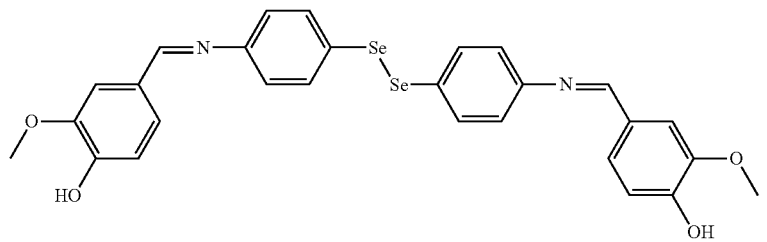

4,4'-(((diselanediylbis(4,1-phenylene))bis(azaneylylidene))bis(methaneylylidene))bis(2-methoxyphenol)

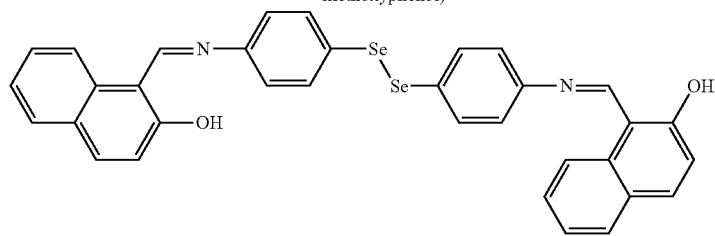

1,1'-(((diselanediylbis(4,1-phenylene))bis(azaneylylidene))bis(methaneylylidene))bis(naphthalen-2-ol)

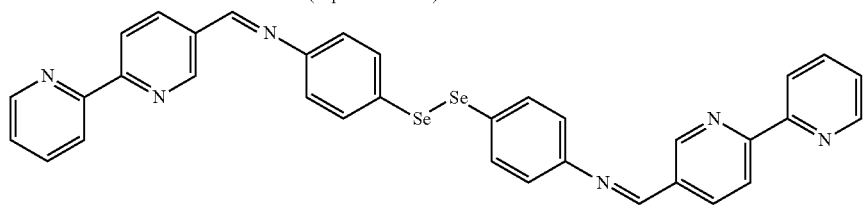

N,N'-(diselanediylbis(4,1-phenylene))bis(1-([2,2'-bipyridin]-5-yl)methanimine)

In some embodiments, the diselenide is a diorganyl diselenide.

In some embodiments, the acid-treated palm waste is carbonized at 400 to 800 degrees Celsius (° C.) under an inert gas.

In some embodiments, the inert gas is nitrogen ($N_2$).

In some embodiments, the acid-treated powder is carbonized at 600° C.

In yet another exemplary embodiment, the method further comprises suspending the diselenide and the aromatic alde- -continued

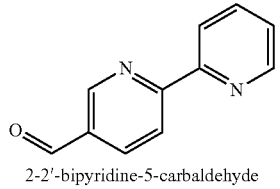

2-2'-bipyridine-5-carbaldehyde

In yet another exemplary embodiment, the method further comprises reacting a bismuth salt with a metal catalyst to form a gelatinous mixture and autoclaving the gelatinous mixture at a temperature of 100 to 200° C. for 24 to 72 h to form a precipitate.

In some embodiments, the bismuth salt is bismuth nitrate pentahydrate ($Bi(NO_3)_3 \cdot 5H_2O$).

In some embodiments, the metal catalyst is titanium (III) chloride.

In some embodiments, the gelatinous mixture is autoclaved at a temperature of 155° C. for 48 h.

In some embodiments, the catalyst precursor is calcined at a temperature of 300 to 700° C. for 12 to 36 h.

In some embodiments, the catalyst precursor is calcined at a temperature of 500° C. for 24 h.

In some embodiments, the organic solvent is an alcohol.

In some embodiments, the method further comprises drying the precipitate at 70 to 150° C. for 1 to 5 h then calcining the precipitate at a heating rate of 0.5 to 3.5° C./min.

In some embodiments, a photocatalytic composite is described. The photocatalytic composite has a layer comprising the photocatalyst.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
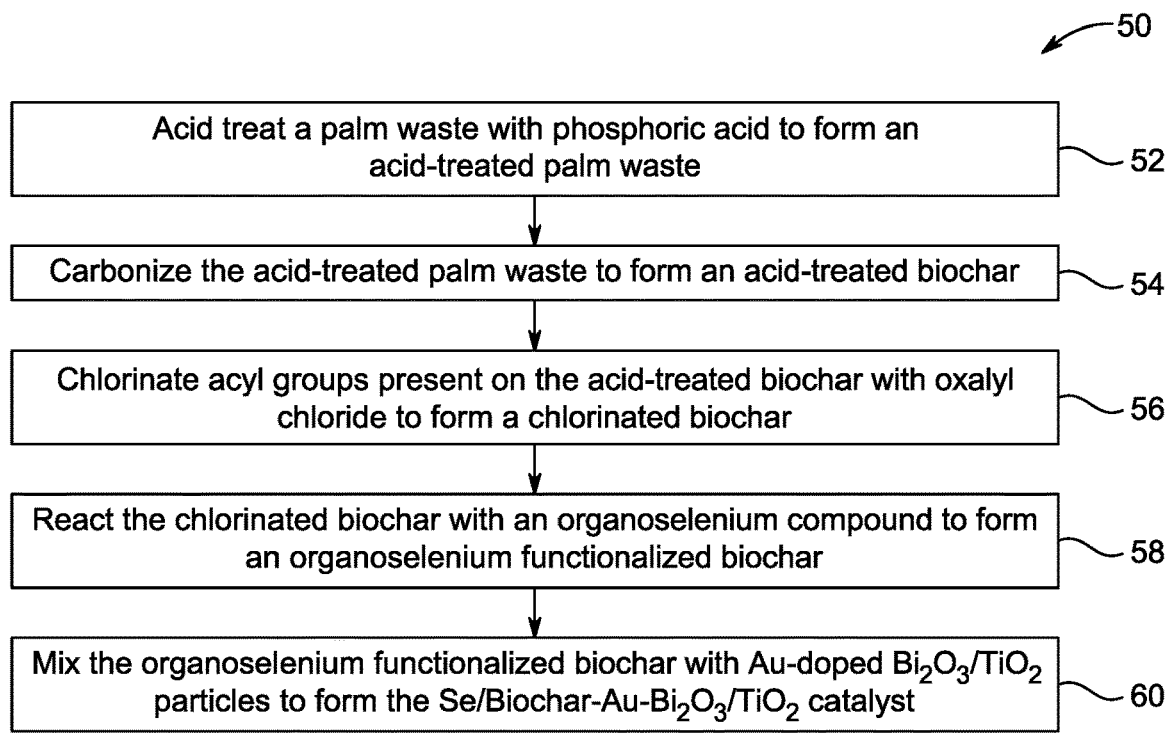
FIG. 1A is a method flowchart for producing a hybrid photocatalyst, according to certain embodiments.

When describing the present disclosure, the terms used are to be construed in accordance with the following definitions, unless a context dictates otherwise. Embodiments of the present invention will now be described more fully hereinafter with reference to the accompanying drawings wherever applicable, in that some, but not all embodiments of the disclosure are shown.

In the drawings, reference numerals designate identical or corresponding parts throughout the several views. Further, as used herein, the words "a," "an," and the like generally carry a meaning of "one or more," unless stated otherwise. Furthermore, the terms "approximately," "approximate," "about," and similar terms generally refer to ranges that include the identified value within a margin of 20%, 10%, or preferably 5%, and any values therebetween.

As used herein, "compound" refers to a chemical entity, whether as a solid, liquid, or gas, and whether in a crude mixture or isolated and purified.

As used herein, the term "nanoparticle" refers to a particle wherein the longest diameter is less than or equal to 1000 nanometers (nm).

As used herein, the term "aromatic compounds" or "aromatic rings," as used herein, refers to hydrocarbon rings that, by the theory of Hückel, have a cyclic, delocalized (4n+2) pi-electron system. Non-limiting examples of aromatic compounds include benzene, benzene derivatives, compounds having at least one benzene ring in their chemical structure.

As used herein, "sol-gel process" refers to a chemical synthesis method for materials, comprising resins, where an oxide network is developed through, for example, polycondensation reactions of a molecular precursor in a liquid. In the present disclosure, the molecular precursors are the silane derivatives (alkoxysilanes). The finished product of a sol-gel synthesis process can be referred to as a "sol-gel material", a "sol-gel processed material", a "sol-gel product" or a "sol-gel processed product."

As used herein, the term "biochar" refers to a type of carbon produced from the thermal decomposition of organic materials, such as agricultural waste, wood chips, or plant residues, under low-oxygen conditions.

As used herein, the term "sonication" refers to the process in which sound waves are used to agitate particles in a solution.

As used herein the term "de-ionized water" refers to the water that has a majority of the ions removed.

As used herein, the term "calcination" refers to heating a compound to a high temperature, under a restricted supply of oxygen, for example to remove impurities or volatile substances and/or to incur thermal decomposition.

As used herein, the term "photocatalyst" refers to a material that absorbs light to bring it to a higher energy level and provides such energy to a reacting substance to make a chemical reaction occur.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all isotopes of a given compound or formula, unless otherwise noted. The present disclosure is intended to include all hydration states of a given compound or formula, unless otherwise noted or when heating a material.

Aspects of the present disclosure are directed toward organoselenium compounds, specifically diselenide bis-Schiff bases, organoselenium compound-based hybrid photocatalysts that synergistically combine the advantages of the diselenide and Schiff base functionalities with gold nanoparticles, bismuth oxide ($Bi_2O_3$), and titanium dioxide ($TiO_2$), supported on a carbon biochar. The hybrid photocatalyst exhibits enhanced photocatalytic performance under visible light irradiation.

FIG. 1A illustrates a flow chart of a method 50 for producing selenium-biochar supported gold-doped bismuth oxide-titanium dioxide (Au-doped $Bi_2O_3/TiO_2$) particles (Se/Biochar-Au—$Bi_2O_3/TiO_2$) catalyst. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 comprises acid-treating a palm waste with phosphoric acid to form an acid-treated palm waste. The palm waste is obtained from various palm tree components, comprising leaves, bark, husk, trunk, leaf sheath, pedicels, and seeds. The palm waste may be washed with water before acid treatment to remove impurities. The water may be tap water, distilled water, bidistilled water, deionized water, deionized distilled water, reverse osmosis water, and/or some other water. After washing, the palm waste may be dried, preferably vacuum-dried at 90 to 120° C., preferably 100 to 110° C., preferably 105° C. for 1 to 3 hours (h), preferably 3 h, before being subjected to acid treatment. After drying, in some embodiments, the palm waste may be crushed using a mixer/a mortar and pestle/ball milling/grinding/a combination thereof to obtain a powder. The powder has an average particle size in the range of 0.30 to 0.70 mm.

Palm waste is primarily rich in cellulose, hemicellulose, and lignin. It is subjected to a chemical pre-treatment/acid treatment to produce a cellulose-rich solid fraction and a hemicellulose-rich liquor. It is preferred to use phosphoric acid ($H_3PO_4$). In some embodiments, pyrophosphoric acid ($H_4P_2O_7$), sulfuric acid ($H_2SO_4$), hydrochloric acid (HCl), and nitric acid ($HNO_3$) may be used. In some embodiments, other pre-treatment methods may be adopted as well, such as physical, chemical, biological treatments, or a mixture thereof, to obtain the cellulose-rich fraction. In some embodiments, the choice of the acid is dependent on the composition of the palm waste. In another embodiment, the palm waste is preferably date palm stalks, which comprise increased amounts of cellulose compared to other date palm components.

At step 54, the method 50 comprises carbonizing the acid-treated palm waste to form an acid-treated biochar. Carbonizing or carbonization is a process by which solid residues with increasing content of the element carbon are formed from organic material, usually by pyrolysis in an inert atmosphere. In some embodiments, heating may be performed by placing the palm waste into a furnace such as a tube furnace, for example, in a ceramic crucible (e.g., an alumina crucible) or other form of containment. In some embodiments, the acid-treated palm waste is carbonized at 400 to 800 degrees Celsius (° C.), preferably 410 to 790° C., preferably 420 to 780° C., preferably 430 to 770° C., preferably 440 to 760° C., preferably 450 to 750° C., preferably 460 to 740° C., preferably 470 to 730° C., preferably 480 to 720° C., preferably 490 to 710° C., preferably 500 to 700° C., preferably 510 to 690° C., preferably 520 to 680° C., preferably 530 to 670° C., preferably 540 to 660° C., preferably 550 to 650° C., preferably 560 to 640° C., preferably 570 to 630° C., preferably 580 to 620° C., and preferably 590 to 610° C. under an inert gas. In some embodiments, the inert gas may be nitrogen, helium, or argon. In another embodiment, the acid-treated powder is carbonized at 600° C. under an $N_2$ atmosphere. The heating temperature is preferably held at about 600° C. for a sufficient duration to allow for complete carbonization of the biomass and decomposition of any remaining organic matter. Preferably the acid-treated powder is held at 600° C. for 5 to 60 min, preferably 10 to 50 min, preferably 20 to 40 min, most preferably 30 min. In one embodiment, the $N_2$ has a flow rate of 100 to 300 mL/min. Preferably, the flow rate of $N_2$ is 150 to 250 mL/min, most preferably 200 mL/min. The furnace is preferably equipped with a temperature control system, which may provide a heating rate of up to 50° C./min, preferably up to 40° C./min, or preferably up to 30° C./min, preferably up to 20° C./min, preferably up to 10° C./min.

During carbonization, the biomass undergoes pyrolysis, where volatile components are driven off, leaving behind carbon-rich material. The carbonization process results in a solid residue called biochar. The biochar comprises-COOH (acyl) functional groups on its surface. The inert atmosphere, preferably under inert $N_2$, prevents any side reactions such as unwanted oxidation during the carbonization process.

At step 56, the method 50 comprises chlorinating acyl groups present on the acid-treated biochar with oxalyl chloride to form a chlorinated biochar. In some embodiments, the acid-treated biochar is chlorinated with a chlorinating agent such as thionyl chloride ($SOCl_2$), chlorosulfonic acid ($ClSO_3H$), calcium hypochlorite, chlorine, oxalyl chloride, phosphorus pentachloride, phosphorus trichloride, trichloroisocyanuric acid, etc. In a preferred embodiment, the chlorinating agent is preferably oxalyl chloride. The chlorination step introduces chlorine functional groups onto the surface of the acid-treated biochar, providing reactive sites for further functionalization. In a preferred embodiment, the chlorination is carried out by chlorinating acyl groups present on the acid-treated biochar with oxalyl chloride. In a preferred embodiment, the chlorination is carried out at 50 to 70° C., preferably 65° C. for 6 to 1 to 48 h, preferably 10 to 40 h, preferably 20 to 30 h, most preferably 24 h, under sonication to form the chlorinated acid-treated biochar.

At step 58, the method 50 comprises reacting the chlorinated biochar with an organoselenium compound to form an organoselenium functionalized biochar. Suitable examples of organoselenium compounds include benzeneselenol, diphenyldiselenide, selenocysteine, and their derivatives thereof. In some embodiments, the organoselenium compound is selected from the group consisting of

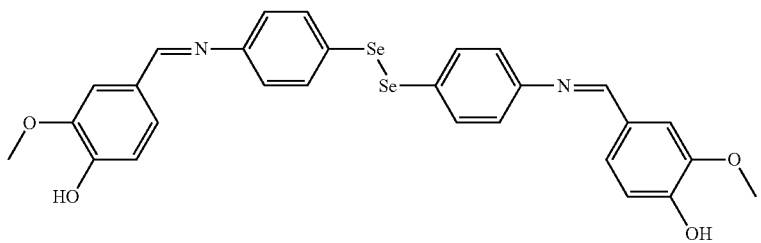

4,4'-(((diselanediylbis(4,1-phenylene))bis(azaneylylidene))bis(methaneylylidene))bis(2-methoxyphenol)

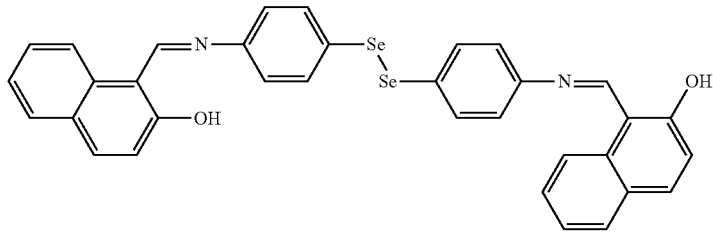

1,1'-(((diselanediylbis(4,1-phenylene))bis(azaneylylidene))bis(methaneylylidene))bis(naphthalen-2-ol)

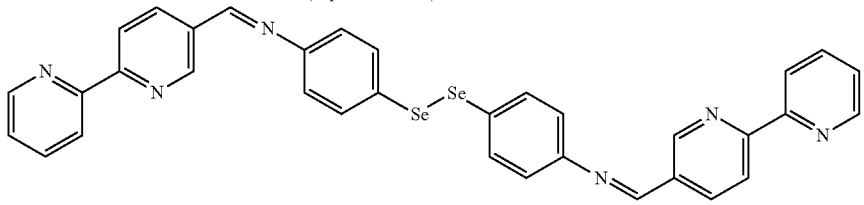

N,N'-diselanediylbis(4,1-phenylene))bis1-([2,2'-bipyridin]-5-yl)methanimine)

This reaction is carried out in the presence of a base. The base may be organic or inorganic. In an embodiment, the base is preferably an organic base, preferably an amine. The amine is preferably an aliphatic amine, more preferably a tertiary amine such as a triethylamine.

In an embodiment, the method of the present disclosure comprises forming the organoselenium compound. The organoselenium compound is preferably formed by reacting a diselenide and an aromatic aldehyde. Suitable examples of diselenide compounds include diselane, carbon diselenide, diorganyl diselenide, diphenyl diselenide, diselanediyldianiline, and their derivatives thereof. In a preferred embodiment, the diselenide compound is 4,4'-diselanediyldianiline. Suitable examples of aromatic aldehyde compounds include cinnamaldehyde, benzaldehyde, naphthaldehyde, and their derivatives thereof. In some embodiments, the aromatic aldehyde is selected from the group consisting of

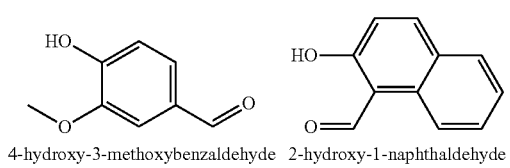

4-hydroxy-3-methoxybenzaldehyde  2-hydroxy-1-naphthaldehyde

-continued

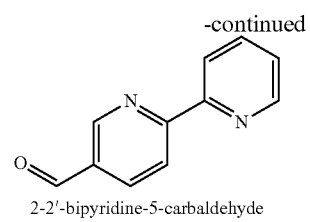

2-2'-bipyridine-5-carbaldehyde

In a preferred embodiment, the diselenide is a diorganyl diselenide. Forming the organoselenium compound comprises suspending the diselenide and the aromatic aldehyde in an organic solvent to obtain a mixture. Suitable examples of organic solvents include methanol, ethanol, acetone, dimethyl sulfoxide (DMSO), dimethylformamide (DMF), dimethylacetamide, isopropanol, benzene, hexane, carbon tetrachloride, toluene, diethyl ether, and chloroform. In a preferred embodiment, the organic solvent is an alcohol, preferably ethanol. The method further comprises heating the mixture at a temperature of 60 to 100° C., preferably 62 to 98° C., preferably 64 to 96° C., preferably 66 to 94° C., preferably 68 to 92° C., preferably 70-90° C., preferably 72 to 88° C., preferably 74 to 86° C., preferably 76 to 84° C., and preferably 78 to 82° C., for 5 to 12 h, and preferably 6 to 11 h, preferably 7 to 10 h, preferably 8 h. In a preferred embodiment, the mixture is heated at a temperature is 80° C.±5° C. for 8 h.

The thus formed organoselenium compound may then be reacted with biochar, preferably the acyl group-activated biochar. In some embodiments, reacting the activated biochar with an organoselenium compound is carried out at 0 to 5° C., preferably 1 to 4° C., preferably 2 to 3° C. for 6 to 12 h, preferably 7 to 11 h, more preferably 8 to 10 h, to obtain the organoselenium-functionalized biochar. The organoselenium-functionalized biochar may be further washed with water to remove any unreacted reactants or impurities. The water may be tap water, distilled water, bidistilled water, deionized water, deionized distilled water, reverse osmosis water, and/or some other water, preferably deionized water. After washing, the organoselenium-functionalized biochar may be dried, preferably under a vacuum, before further processing.

At step 60, the method 50 comprises mixing the organoselenium functionalized biochar with Au-doped $Bi_2O_3/TiO_2$ particles to form the Se/Biochar-Au—$Bi_2O_3/TiO_2$ catalyst. In some embodiments, the Au-doped $Bi_2O_3/TiO_2$ particles may be dissolved in a solvent, preferably water, alcohol (ethanol, isopropanol), or a combination thereof, before mixing. In a preferred embodiment, the solvent is water or ethanol. After dissolution or suspension of the gold-doped bismuth oxide-titanium dioxide in the solvent, the solution may be agitated via mixing/sonication for 10 to 20 min, preferably 15 min, to ensure complete dissolution of the gold-doped bismuth oxide-titanium dioxide in the solvent. After complete dissolution, the organoselenium functionalized biochar is mixed with the gold-doped bismuth oxide-titanium dioxide (Au-doped $Bi_2O_3/TiO_2$) particles. The mixing may be carried out manually or with the help of a stirrer for a period of 12 to 48 h, preferably around 24 h, to form the hybrid photocatalyst. Preferably, the hybrid photocatalyst is further dried at 80 to 120° C., preferably 90 to 110° C., most preferably 100° C. before use.

Figure 1B:
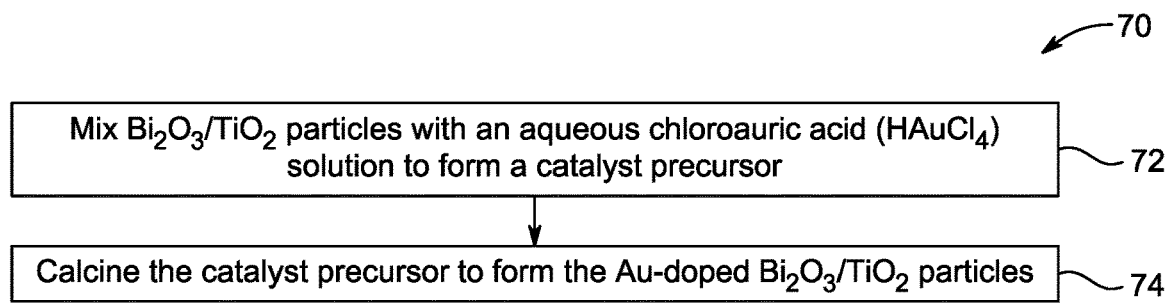
FIG. 1B is a method flowchart for synthesizing Au-doped $Bi_2O_3/TiO_2$ particles, according to certain embodiments.

FIG. 1B illustrates a flow chart of a method 70 for synthesizing Au-doped $Bi_2O_3/TiO_2$-particles. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 comprises mixing $Bi_2O_3/TiO_2$ particles with an aqueous chloroauric acid ($HAuCl_4$) solution to form a catalyst precursor. The $Bi_2O_3/TiO_2$ particles are added to the solution of $HAuCl_4$ in the presence of the reducing agent. The reducing agent, also known as a reductant, is a chemical substance that loses electrons and gets oxidized in a chemical reaction. It is usually in one of its lowest possible oxidation states and acts as an electron donor. When a reducing agent loses electrons in a redox reaction, it becomes oxidized. Examples of reducing agents include sodium borohydride, lithium aluminum hydride, zinc amalgam, and diborane. The mixing may be carried out manually or with the help of a mixing apparatus.

At step 74, the method 70 comprises calcining the catalyst precursor to form the Au-doped $Bi_2O_3/TiO_2$ particles. The calcination of the precipitate is carried out by heating to a high temperature, under a restricted supply of oxygen. This is performed to aid in removal of impurities or volatile substances and to incur thermal decomposition. Typically, the calcination is carried out in a furnace preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min, preferably up to 2° C./min, and preferably up to 1° C./min. In some embodiments, the reaction mixture is calcined at a temperature of 300 to 700° C., preferably 350 to 650° C., preferably 400 to 600° C., and preferably 450 to 550° C. for 12 to 36 h, preferably 14 to 34 h, preferably 16 to 32 h, preferably 18 to 30 h, preferably 20 to 28 h, preferably 22 to 26 h to form the Au-doped $Bi_2O_3/TiO_2$ particles. In a preferred embodiment, the reaction mixture is calcined at a temperature of 500° C. for 24 h to form the Au-doped $Bi_2O_3/TiO_2$ particles.

Figure 1C:
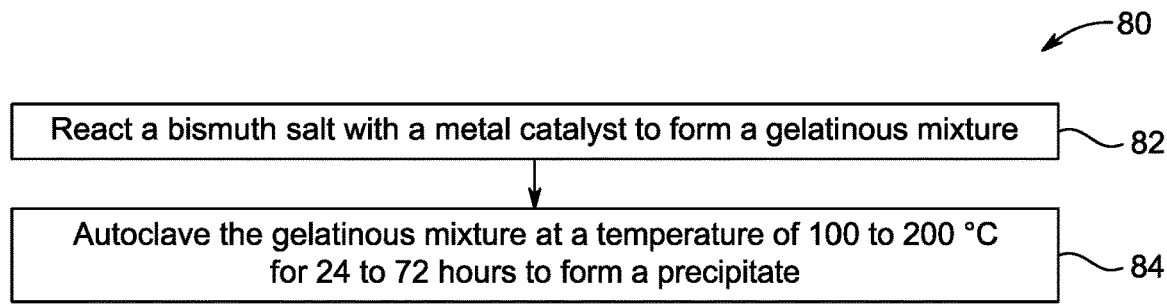
FIG. 1C is a method flowchart for synthesizing $Bi_2O_3/TiO_2$ particles, according to certain embodiments.

FIG. 1C illustrates a flow chart of a method 80 for synthesizing $Bi_2O_3/TiO_2$ particles. The order in which the method 80 is described is not intended to be construed as a limitation, and any number of the described method steps can be combined in any order to implement the method 80. Additionally, individual steps may be removed or skipped from the method 80 without departing from the spirit and scope of the present disclosure.

At step 82, the method 80 comprises reacting a bismuth salt with a metal catalyst to form a mixture, preferably a gel. Suitable examples of bismuth salts include bismuth chloride, bismuth sulfate, bismuth nitrate, and bismuth oxychloride. In a preferred embodiment, the bismuth salt is bismuth nitrate pentahydrate ($Bi(NO_3)_3 \cdot 5H_2O$). The metal catalyst comprises a metal selected from palladium, cobalt, titanium, iron, molybdenum, copper, and the like. In a preferred embodiment, the metal catalyst is titanium (III) chloride. The reaction may be carried out via solvothermal method, microwave method, wet-impregnation method, or a similar method. In a preferred embodiment, the reaction may be carried out via the solvothermal method using an autoclave to obtain the gelatinous mixture.

At step 84, the method 80 comprises autoclaving the mixture at a temperature of 100 to 200° C., preferably 110 to 190° C., preferably 120 to 180° C., preferably 130 to 170° C., and preferably 140 to 160° C. for 24 to 72 h, preferably 30 to 66 h, preferably 36 to 60 h, and preferably 42 to 54 h to form a precipitate. In a preferred embodiment, the autoclaving of the gelatinous mixture is done at a temperature of 155° C. for 48 h. The precipitate may be further dried at 70 to 150° C., preferably 80 to 140° C., preferably 90 to 130° C., preferably 100 to 120° C. for 1 to 5 h, and preferably 2 to 4 h, and then calcining the precipitate at a heating rate of 0.5 to 3.5° C./min, preferably 1 to 3° C./min, preferably 1.5 to 2.5° C./min. In a preferred embodiment, the precipitate is dried at a temperature of 110° C. at 2° C./min for 3 h, and then the precipitate is calcined at a heating rate of 2° C./min to obtain the $Bi_2O_3/TiO_2$ particles.

In some embodiments, a photocatalytic composite having a layer comprising the photocatalyst is made by the aforementioned process. The photocatalyst may be used for photocatalytic degradation under visible/UV light for degradation of pollutants like pharmaceutical pollutants, dyes, pesticides, heavy metals, etc.

In another embodiment the photocatalyst may be used for wastewater treatment. When used in this way, the photocatalyst oxidizes organic pollutants or hazardous organic compounds into nontoxic or less harmful products, such as $CO_2$ and water. The photocatalyst can further destroy certain microorganisms, such as bacteria and some viruses, in the secondary wastewater treatment. In another embodiment the photocatalyst may be used for the storage of energy. When used in this way, the $TiO_2$ and $Bi_2O_3$ serve as light absorbing materials which absorb light to generate electron-hole pairs. The gold nanoparticles act as an electron trap center and accelerate the separation of photo-generated charges. Thus, an electron hole will have more time to react as an oxidizer on the photocatalyst surface. Moreover, the gold surface provides increased active sites for a reduction reaction.

The photocatalytic performance of the photocatalyst can vary based on the size, shape, and composition. Compared with other photocatalytic materials, nanoparticles have a large surface area and a broadened band gap which improves the absorption of light and storage efficiency of the photocatalyst. In one embodiment, the photocatalyst has an average particle size of 5 to 25 nm or less, preferably 24 nm or less, preferably 23 nm or less, preferably 22 nm or less, preferably 21 nm or less, preferably 20 nm or less, preferably 19 nm or less, preferably 18 nm or less, preferably 17 nm or less, preferably 16 nm or less, preferably 15 nm or less, preferably 14 nm or less, preferably 13 nm or less, preferably 12 nm or less, preferably 11 nm or less, most preferably 10 nm or less. In yet another embodiment, the photocatalyst particles aggregate together to have an aggregated particle size of 10 to 100 nm or less, preferably 90 nm or less, preferably 80 nm or less, most preferably 70 nm or less. In one embodiment, the photocatalyst has a surface area of 10 to 70 $m^2/g$, preferably 15 to 65 $m^2/g$, most preferably 20 to 60 $m^2/g$.

While the reduced size ensures enhanced photocatalytic performance, it makes it difficult to recover the photocatalysts from aqueous media when used as for wastewater treatment. In one embodiment, the photocatalyst is coated on the surface with polymeric or inorganic support materials. Common supports for photocatalysis include glass, stainless steel, plastics, and textiles. The support material may coat the photocatalyst, be arranged as a core structure with the photocatalyst provided as a shell around, or may immobilize and fix the photocatalyst to the support material. This improves the recovery of the photocatalyst for effective reuse or recycling and leads to improved and desired target properties, such as increased optical properties, thermal stability, photocatalytic activity, and adsorption. The supported photocatalyst system may further provide better dispersion, reduced agglomeration, enhanced surface area, and easy recovery of the photocatalyst. In a preferred embodiment, the photocatalyst is present in and/or on a support matrix that the blend of the biochar, $TiO_2$, $Bi_2O_3$, gold, and organoselenium compound synergistically increase the amount of visible light absorbed and available for photocatalytic reactions.

EXAMPLES

The following examples demonstrate a method for producing a hybrid catalyst comprising an organoselenium functionalized biochar. The examples are provided solely for illustration and are not to be construed as limitations of the present disclosure, as many variations thereof are possible without departing from the spirit and scope of the present disclosure.

Example 1: Synthesis of Organoselenium Compound (Diselenide Bis-Schiff Bases)

Figure 2:
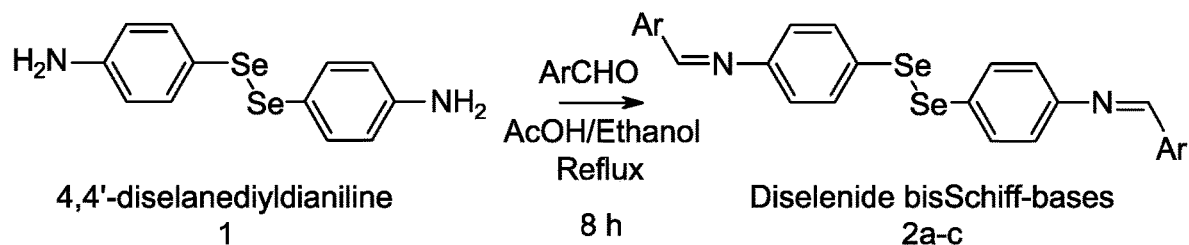
FIG. 2 is a schematic illustration depicting a scheme for the synthesis of an organoselenium compound, specifically a diselenide bisSchiff-base, used for the synthesis of the hybrid photocatalyst, according to certain embodiments.
Figure 3:
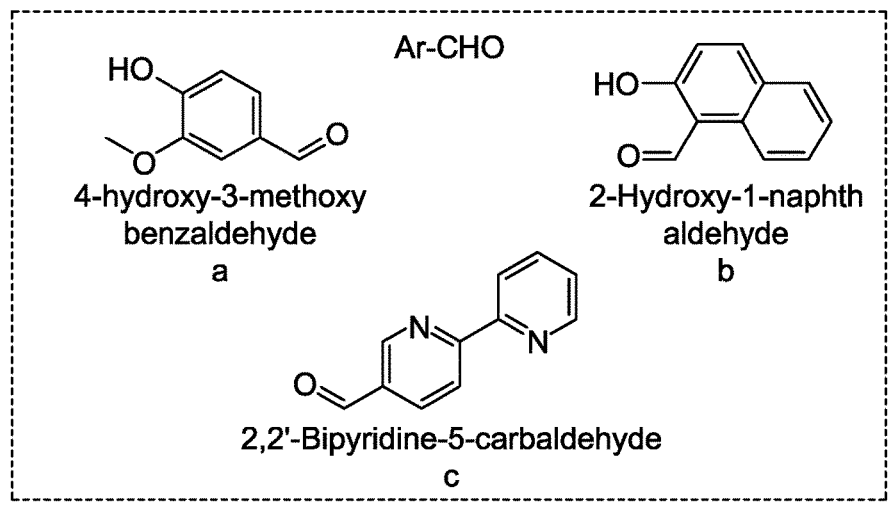
FIG. 3 shows different aromatic aldehydes used for the synthesis of the organoselenium compound, specifically a diselenide bisSchiff-base, according to certain embodiments.

The diselenide bis-Schiff base was fabricated by suspending 4,4-diselanediyldianiline (1) 60 millimole (mmol), aromatic aldehyde 132 mmol, and AcOH 100 microliters (μL) in 60 milliliters (mL) ethanol and the mixture was heated at 80° C. for 8 hours (h). The formed precipitate was washed with aqueous ethanol ($C_2H_5OH$) and recrystallized with $C_2H_5OH$ to provide an orange solid. FIG. 2 is a schematic illustration depicting a scheme for the synthesis of an organoselenium compound (diselenide bis-Schiff base) used for the synthesis of a hybrid photocatalyst. FIG. 3 shows different aromatic aldehydes used for the synthesis of the organoselenium compound (diselenide bis-Schiff base).

Example 2: Synthesis of Se—Au—$Bi_2O_3$/$TiO_2$—C

The Au—$Bi_2O_3$/$TiO_2$ hybrid catalyst was synthesized with organoselenium by combining a plurality of components on a biochar support matrix. Initially, carbon biochar was prepared using one or more palm waste components like leaves, bark, husk, and the like were collected. Further, the palm waste sample was washed, vacuum dried, crushed, and refluxed into phosphoric acid ($H_3PO_4$), followed by carbonization at 600° C. under an inert nitrogen ($N_2$) atmosphere, washed and dried overnight at 105° C. Furthermore, this biochar with organoselenium precursor and Au—$Bi_2O_3$/$TiO_2$ catalyst was functionalized using a wet-impregnation hybridization technique. The wet-impreganation hybridization technique comprises dissolving the Au—$Bi_2O_3$/$TiO_2$ nanoparticles in an aqueous or organic solution, then adding Au—$Bi_2O_3$/$TiO_2$-containing organic solution to the biochar with organoselenium precursor. The mixture ratio may depend on the desired loading of the catalyst on the biochar. Once the catalyst is added to the biochar, the mixture is calcined and dried to obtain the biochar-supported catalyst. If necessary, a binder such as an activated carbon, e.g., a mixture of the biochar with a material such as a carboxy cellulose or salt thereof (e.g., sodium carboxymethylcellulose) in an amount of 1-5% by weight based on the total weight of the biochar, preferably about 2 wt. %, may be used to enhance the adhesion between the catalyst nanoparticles and the biochar surface.

Example 3: Synthesis of Au—$Bi_2O_3$/$TiO_2$ Nanoparticles

A porous $Bi_2O_3$/$TiO_2$ photocatalyst was synthesized via a solvothermal method. Bismuth nitrate pentahydrate $Bi(NO_3)_3 \cdot 5H_2O$ mixed with ammonium oxalate and ascorbic acid was added to titanium (III) chloride solution and sodium lauryl sulfate. Then, deionized water was added and continuously stirred for 45 min (min). The mixture formed was further transferred into a 100 mL Teflon-lined stainless-steel autoclave. The autoclave was heated at 155° C. for 48 hours (h). The precipitate was collected by filtration and washed several times with deionized water and ethanol to remove the remaining and unreacted reagents. Finally, it was dried at 110° C. for 3 h in a vacuum and calcined in the air at a heating rate of 2° C. per minute (° C./min) from room temperature up to 550° C. for 180 min to obtain the $Bi_2O_3$/$TiO_2$ photocatalysts. Furthermore, the $Bi_2O_3$/$TiO_2$ photocatalysts were dipped in an aqueous solution of chloroauric acid ($HAuCl_4$) with appropriate concentration using a deposition-precipitation method, where a gold precursor is reduced and precipitated onto the surface in the presence of a reducing agent. The prepared solution was subjected to sonication for 1 h. The resulting solution was rested overnight, and then the solution was evaporated by drying at 100° C. for 24 h. The dried catalyst was crushed and calcined at 500° C. for 2 h.

Example 4: Synthesis of (Au—$Bi_2O_3$/$TiO_2$ in Biochar)

The sol-gel method converts biomass to biochar through the pyrolysis process, and then, the produced biochar is acid treated, followed by carbonization at 600° C. under an inert $N_2$ atmosphere, washed and dried overnight at 105° C.

Subsequently, the acid-treated biochar is mixed with ethanol slurry containing Au—$Bi_2O_3$/$TiO_2$ nanoparticles which is aged for 24 h in an air tight container, and dried in an oven at 100° C. for 12 h to obtain a xerogel. The xerogel was fully ground into a powder and then calcinated in a nitrogen atmosphere at 500° C. to 700° C. to produce a highly stable biochar-supported Au—$Bi_2O_3$/$TiO_2$ nanocomposite.

Example 5: Synthesis of Se-Biochar

Biochar-COOH was treated with oxalyl chloride $(COCl)_2$ to convert the carboxylic group into an acid chloride group (biochar-COCl). The prepared biochar-COCl was reacted with organoselenium precursor and produced functionalized biochar with organoselenium derivatives. In brief, biochar-COOH was refluxed with excess oxalyl chloride using an ultrasonic bath for 24 h at 65° C. to form biochar-COCl. Further, the triethylamine ($Et_3N$; 1 eq) was added to a solution of readily available organoselenium precursor, followed by dropwise mixing with biochar-COCl at 0° C. for 6 h and subsequent stirring at room temperature for six more hours. The reaction mixture was subsequently filtered and washed with excess deionized water. The resulting black solid was dried under a vacuum, and the Se-Biocar derivative was obtained.

Example 6: Synthesis of Au—$Bi_2O_3$/$TiO_2$ on Se-Biochar

Se-biochar powder was dissolved in ethanol. Further, a solution or suspension of Au—$Bi_2O_3$/$TiO_2$ was mixed with or added dropwise with vigorous stirring. The resulting suspension containing a white precipitate was stirred for 3 h, followed by standing for 20 h. The mixture was evaporated under reduced pressure, leaving a solid powder, which was then annealed in a quartz tube for 4 h at 500° C. under air. The catalyst was rinsed with water several times and dried.

Figure 4:
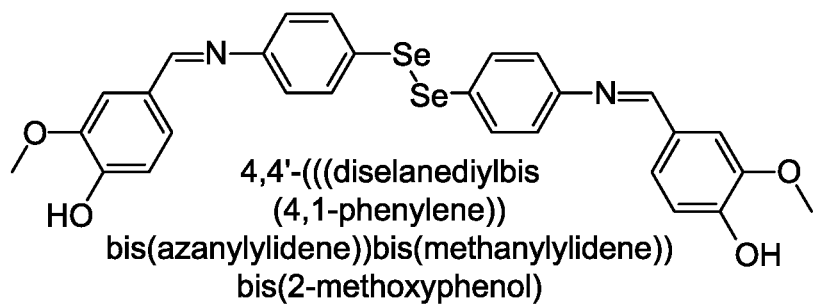
FIG. 4 shows different organoselenium compounds, specifically bisSchiff bases, used to synthesize the hybrid photocatalyst, according to certain embodiments.
Figure 4:
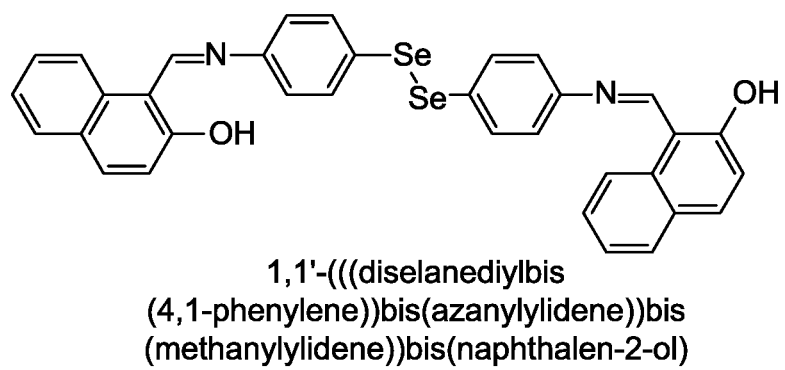
Figure 4:
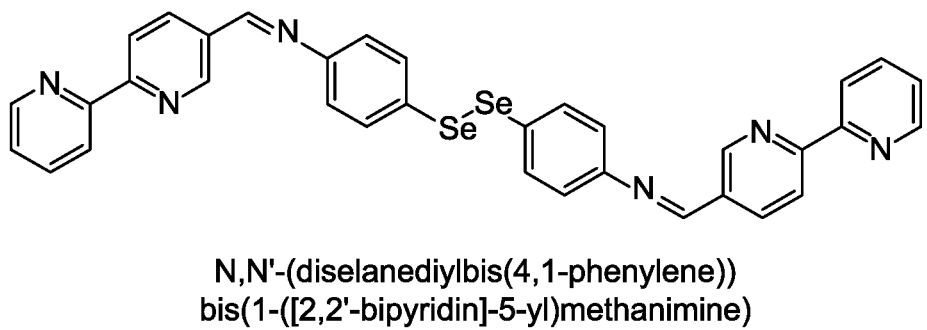

Example 7: Synthesis of Selenium Co-Doping in Au—$Bi_2O_3$/$TiO_2$-Biochar Catalyst The impregnation method was used to co-dope the organoselenium compound in the Au—$Bi_2O_3$/$TiO_2$-biochar photocatalyst. For this purpose, co-doped Au—$Bi_2O_3$/$TiO_2$-biochar was poured in a mixture of water and ethanol and ultrasonicated for 15 min. Then, specific amounts of the organoselenium compound were added to the solution. Then, the solution was stirred for 24 h and dried in a 100° C. oven. FIG. 4 shows different organoselenium compounds (bis-Schiff bases) used to synthesize the hybrid photocatalyst.

Hybrid photocatalysts based on organoselenium compounds (diselenide bis-Schiff bases), gold nanoparticles, $Bi_2O_3$, $TiO_2$, and carbon biochar are described. The photocatalyst exhibits enhanced photocatalytic performance under visible light irradiation, making it a promising solution for sustainable environmental remediation and energy applications. Results show improved photocatalytic efficiency and stability, with significant implications for the field of photocatalysis.

Numerous modifications and variations of the present disclosure are possible in light of the above teachings. It is therefore to be understood that within the scope of the appended claims, the invention may be practiced otherwise than as specifically described herein.

The invention claimed is:

1. A method for producing a Se/Biochar-Au—$Bi_2O_3$/$TiO_2$ catalyst, comprising:
   acid treating a palm waste with phosphoric acid to form an acid-treated palm waste,
   carbonizing the acid-treated palm waste to form an acid-treated biochar,
   chlorinating acyl groups present on the acid-treated biochar with oxalyl chloride to form a chlorinated biochar;
   reacting the chlorinated biochar with an organoselenium compound to form an organoselenium functionalized biochar;
   mixing the organoselenium functionalized biochar with Au-doped $Bi_2O_3$/$TiO_2$ particles to form the Se/Biochar-Au—$Bi_2O_3$/$TiO_2$ catalyst.

2. The method of claim 1, further comprising:
   reacting a diselenide and an aromatic aldehyde to form the organoselenium compound.

3. The method of claim 1, further comprising:
   mixing $Bi_2O_3$/$TiO_2$ particles with an aqueous chloroauric acid ($HAuCl_4$) solution to form a catalyst precursor, then
   calcining the catalyst precursor to form the Au-doped $Bi_2O_3$/$TiO_2$ particles.

4. The method of claim 1, wherein the organoselenium compound is selected from the group consisting of

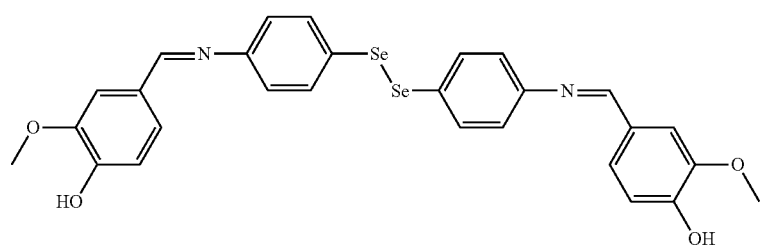

4,4'-(((diselanediylbis(4,1-phenylene))bis(azaneylylidene))bis(methaneylylidene))bis(2-methoxyphenol)

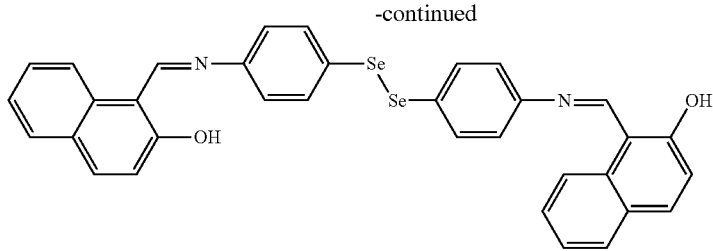

1,1'-(((diselanediylbis(4,1-phenylene))bis(azaneylylidene))bis(methaneylylidene))bis(naphthalen-2-ol)

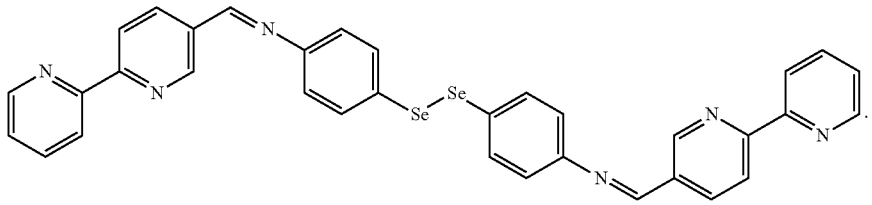

N,N'-(diselanediylbis(4,1-phenylene))bis(1-([2,2'-bipyridin]-5-yl)methanimine)

5. The method of claim 2, wherein the diselenide is a diorganyl diselenide.

6. The method of claim 1, wherein the acid-treated palm waste is carbonized at 400 to 800 degrees Celsius (° C.) under an inert gas.

7. The method of claim 6, wherein the inert gas is nitrogen ($N_2$).

8. The method of claim 6, wherein the acid-treated palm waste is carbonized at 600° C.

9. The method of claim 2, further comprising:
suspending the diselenide and the aromatic aldehyde in an organic solvent to obtain a mixture; and
heating the mixture at a temperature of 60 to 100° C. for 6 to 10 hours (h).

10. The method of claim 9, wherein the mixture is heated at a temperature is 80° C.±5° C. for 8 h.

11. The method of claim 2, wherein the aromatic aldehyde is selected from the group consisting of

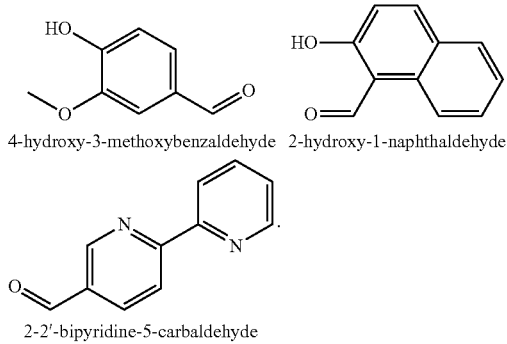

4-hydroxy-3-methoxybenzaldehyde  2-hydroxy-1-naphthaldehyde 2-2'-bipyridine-5-carbaldehyde 12. The method of claim 1, further comprising:
reacting a bismuth salt with a metal catalyst to form a gelatinous mixture; and
autoclaving the gelatinous mixture at a temperature of 100 to 200° C. for 24 to 72 h to form a precipitate.

13. The method of claim 12, wherein the bismuth salt is bismuth nitrate pentahydrate ($Bi(NO_3)_3 \cdot 5H_2O$).

14. The method of claim 12, wherein the metal catalyst is titanium (III) chloride.

15. The method of claim 12, wherein the gelatinous mixture is autoclaved at a temperature of 155° C. for 48 h.

16. The method of claim 3, wherein the catalyst precursor is calcined at a temperature of 300 to 700° C. for 12 to 36 h.

17. The method of claim 3, wherein the catalyst precursor is calcined at a temperature of 500° C. for 24 h.

18. The method of claim 9, wherein the organic solvent is an alcohol.

19. The method of claim 12, further comprising:
drying the precipitate at 70 to 150° C. for 1 to 5 h then calcining the precipitate at a heating rate of 0.5 to 3.5° C./min.

20. A photocatalytic composite, comprising:
a core and an active layer,
wherein the active layer comprises:
the Se/Biochar-Au—$Bi_2O_3$/$TiO_2$ catalyst made by the process of claim 1, and
optionally, a binder,
wherein the photocatalytic composite is in the form of particles having a surface area of 10 to 70 $m^2$/g and an average particle size of less than 25 nm, and
wherein in the Se/Biochar-Au—$Bi_2O_3$/$TiO_2$ catalyst, Au-doped $Bi_2O_3$/$TiO_2$ particles are immobilized and fixed to the organoselenium functionalized biochar.

* * * * *